United States Patent
Owen

[11] Patent Number: 5,809,857
[45] Date of Patent: Sep. 22, 1998

[54] SAW SYSTEM FOR DOUBLE MITRE AND PLUMB CUTTING

[75] Inventor: Reginald John Owen, Warrnambool, Australia

[73] Assignee: Mount Shamrock Pty. Ltd., Warrnambool, Australia

[21] Appl. No.: 664,594

[22] Filed: Jun. 17, 1996

[30] Foreign Application Priority Data

Jun. 19, 1995 [AU] Australia .................................. PN3590

[51] Int. Cl.⁶ ...................................................... B27B 5/22
[52] U.S. Cl. ........................... 83/404.1; 83/409; 83/425.1; 83/425.2; 83/432; 83/435.11; 83/435.22; 83/471; 83/508.2; 83/581; 144/3.1; 144/216; 144/242.1; 144/367; 144/379
[58] Field of Search .............................. 83/409, 424, 425, 83/425.2, 432, 433, 438, 441, 471, 404.1, 422, 508.2, 508.3, 581, 676, 435.11, 435.22, 404, 425.1; 144/1.1, 242.1, 3.1, 216, 367, 379

[56] References Cited

U.S. PATENT DOCUMENTS

| 3,080,895 | 3/1963 | Mayo | 83/404.1 |
|---|---|---|---|
| 3,229,732 | 1/1966 | Mayo | 83/404.1 |
| 3,367,375 | 2/1968 | Watson, Jr. | 83/404.1 |
| 3,380,494 | 4/1968 | Mayo | 83/404.1 |
| 3,388,727 | 6/1968 | Kotila | 83/409 |
| 3,757,625 | 9/1973 | Pfenning et al. | 83/432 X |
| 3,952,620 | 4/1976 | Adams | 83/432 X |
| 4,098,310 | 7/1978 | Sanford et al. | 83/409 X |
| 4,221,246 | 9/1980 | Grutter | 83/404.1 X |
| 4,277,998 | 7/1981 | Mayo | 83/432 X |
| 4,545,274 | 10/1985 | Germond | 83/404.1 X |
| 4,770,076 | 9/1988 | Wilson | 83/432 X |

FOREIGN PATENT DOCUMENTS 52287  4/1977  Japan ....................................... 83/581

Primary Examiner—Clark F. Dexter
Attorney, Agent, or Firm—Merchant, Gould, Smith, Edell, Welter & Schmidt, P.A.

[57] ABSTRACT

A saw system includes a support table (12) and a first elongate tower assembly (50) pivotally mounted relative to the table (12). A second elongate tower assembly (60) is also mounted for rotation relative to the table (12) and is spaced from the first tower assembly (50). The second tower assembly (60) is moveable towards and away from the tower (50) by roller wheels (42 and 43) which engage on guide rails (34 and 36) to enable the second tower assembly (60) to be moved. The second tower assembly (60) and the first tower assembly (50) are rotatable to set the tower assemblies at a predetermined angle with respect to the table (12) and carry saws for making a cut in the workpiece. Ram assemblies (130 and 160) on each tower enable movement of the workpiece downwardly relatively to the saws so that the workpiece is driven past the saws and cut by the saws.

10 Claims, 2 Drawing Sheets

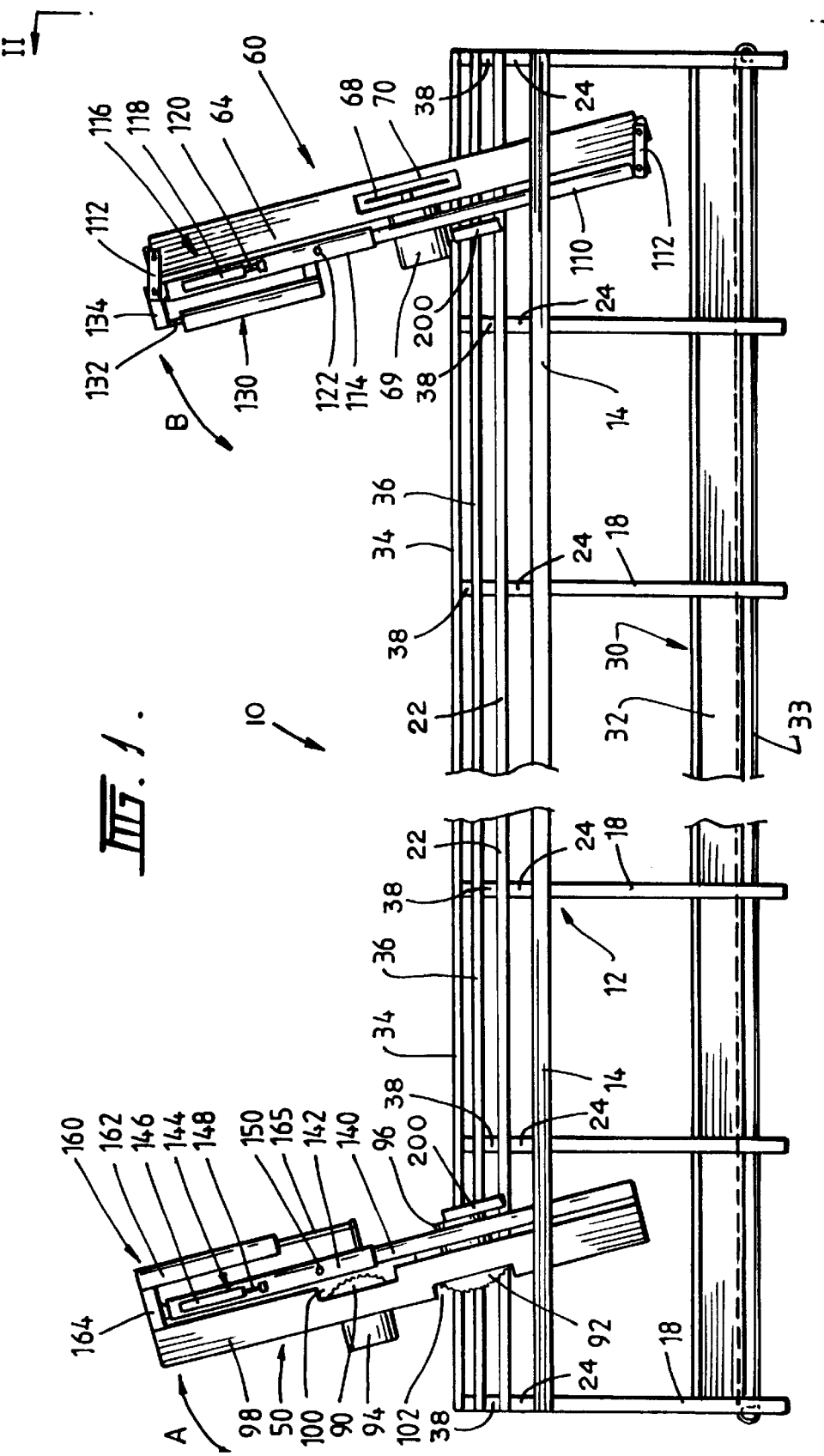

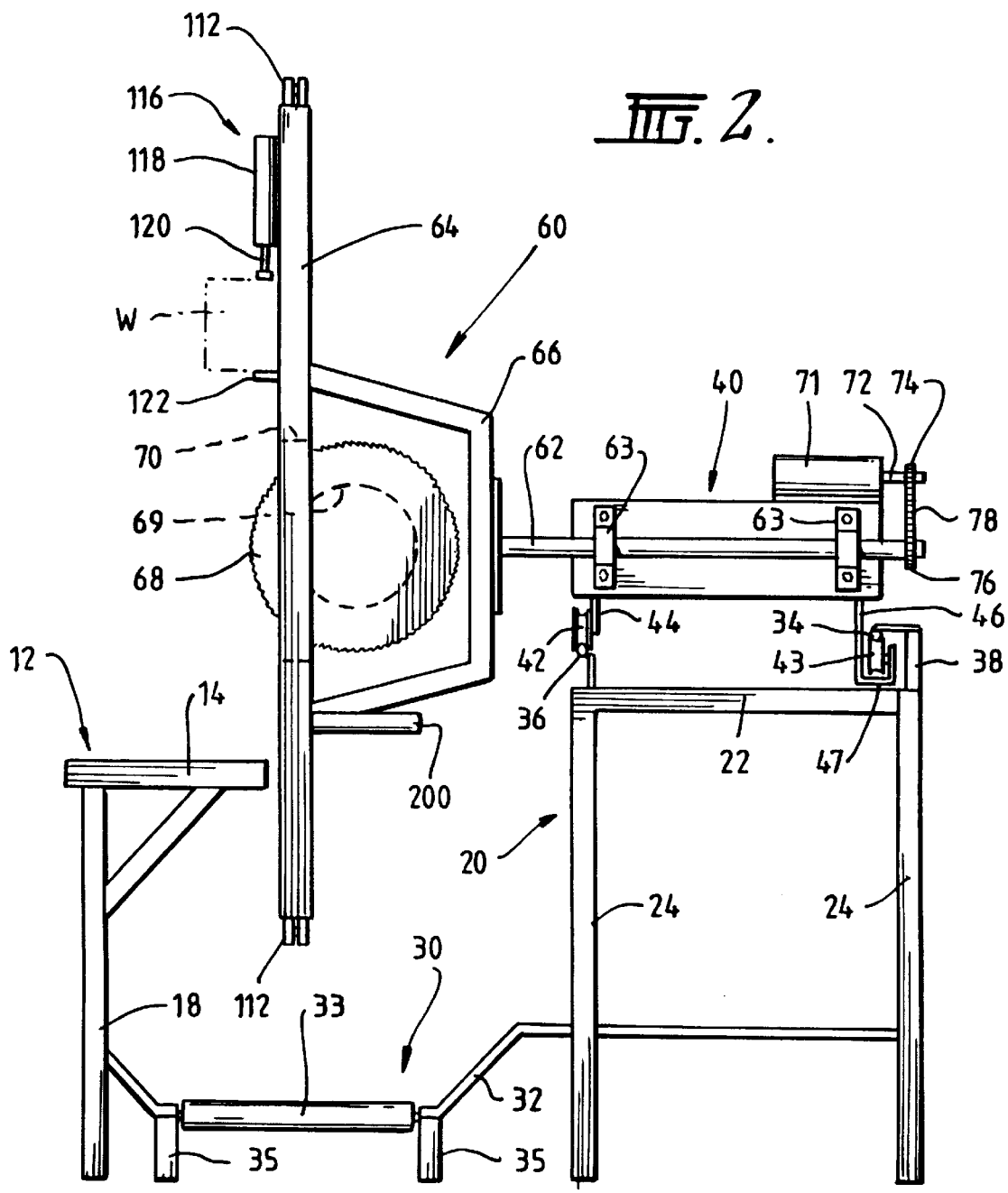

SAW SYSTEM FOR DOUBLE MITRE AND PLUMB CUTTING

FIELD OF THE INVENTION

This invention relates to a saw system for cutting a workpiece and, in particular, but not exclusively, to a saw system for cutting timber rafters for use in hip roof systems.

BACKGROUND OF THE INVENTION

Timber rafters, conventionally referred to as "jack rafters" for hip roof systems generally comprise a single left or right mitre cut at one end and a plumb cut at the other end. The mitre cut and plumb cut are cut at a predetermined angle with respect to the longitudinal axis of the rafter to suit the particular roof system in which the jack rafter is to be installed. Conventional techniques for cutting jack rafters generally comprise bench mounted circular saws. Typically, a workman will make a first cut at a predetermined angle in a piece of wood to form the first mitre cut. The piece of wood is then maneuvered to make a second cut at the same end to form the double mitre compound cut. The wood is then moved and the saw reset to make a plumb cut at the other end of the beam at the required angle dependent on the hip roof system on which the rafter is to be installed.

The conventional technique for forming jack rafters is therefore labour intensive and the number of rafters which can be manufactured in a predetermined time period is relatively small.

SUMMARY OF THE INVENTION

The object of this invention is to provide a saw system for cutting a workpiece which will decrease the amount of labour required to cut the workpiece and therefore increase productivity.

The invention in a first aspect may be said to reside in a saw system for cutting an elongate workpiece, including:
   support means for supporting a first saw assembly for cutting the workpiece;
   pivotal coupling means coupled to the support means for enabling the support means and first saw assembly to rotate in a substantially vertical plane substantially parallel to the longitudinal axis of the workpiece, for setting a cutting angle at which the first saw assembly cuts the workpiece; and
   workpiece moving means for moving the workpiece downwardly in a substantially vertical plane relative to the first saw assembly for cutting the workpiece.

Preferably the saw system includes a second support means for supporting a second saw assembly for making a second cut in the workpiece.

Preferably the saw system includes a second pivotal coupling means for pivotally coupling the second support means and second saw assembly for pivotal movement in the substantially vertical plane for setting a cutting angle at which the second saw assembly cuts the workpiece.

Preferably the second support means and second saw assembly are moveable in a substantially horizontal plane relative to the support means and first saw assembly to set the length of the workpiece cut by the saw system.

Preferably the first saw assembly comprises two circular saws which are arranged at a predetermined angle with respect to one another to cut a double compound mitre cut on the workpiece.

Preferably the second saw assembly comprises a single circular saw for cutting a plumb cut on the workpiece.

Preferably the first and second support means each comprise an elongate tower assembly and each of the pivotal coupling means comprise a shaft coupled to a respective one of the towers for rotation about a longitudinal axis of the shaft to thereby rotate the towers in the vertical plane, the towers each having workpiece clamping means for clamping a workpiece to the towers, and wherein the workpiece moving means is coupled to the clamping means for driving the clamping means and therefore the workpiece downwardly relative to the saw assemblies for cutting the workpiece.

The invention in a second aspect may be said to reside in a saw system for cutting a workpiece, including:
   a first pivotally mounted tower for supporting a pair of circular saws arranged at a predetermined angle with respect to one another for making a double mitre cut in the workpiece;
   a second pivotally mounted tower spaced horizontally from the first tower for supporting a second circular saw for making a plumb cut in the workpiece;
   angle setting means for setting the towers at predetermined angles with respect to the vertical for setting predetermined angles of the double mitre cut and the plumb cut;
   workpiece support means for supporting the workpiece relative to the first and second towers; and
   workpiece drive means for driving the support means and therefore the workpiece downwardly relative to the towers so that the double mitre cut and plumb cut can be simultaneously made by the saw system.

Preferably the saw system includes moving means for moving the second tower relative to the first tower to set the length of the workpiece cut by the saw system.

Preferably the moving means comprises a pair of rails upon which the second tower is mounted and moving means for moving the second tower relative to the first tower on the rails to thereby set the distance between the first and second towers and thereby the length of the workpiece cut by the saw system.

Preferably the towers include a rod arranged generally in the longitudinal axis of the towers and a sleeve mounted for sliding movement on the rod and preferably the workpiece support means comprises abutment members on each of the sleeves for supporting the workpiece and a ram assembly on each of the sleeves for engaging the workpiece and clamping the workpiece to the abutment members.

Preferably the drive means comprises a ram assembly for sliding the sleeve and therefore the abutment member and workpiece when supported on the abutment member downwardly on the rod so that the workpiece is driven past the saws for making the double mitre cut and the plumb cut.

Preferably the towers each include a shaft for pivotally mounting the towers and the angle setting means each comprise a motor and chain assembly for rotating the respective shaft about its longitudinal axis to thereby pivot the towers in a substantially vertical plane to set the angle of the tower relative to the vertical.

BRIEF DESCRIPTION OF THE DRAWINGS

A preferred embodiment of the invention will be described, by way of example, with reference to the accompanying drawings in which:

FIG. 1 is a side view of the saw system of the preferred embodiment of the invention; and FIG. 2 is an end elevation along the line II—II of FIG. 1.

DESCRIPTION OF THE PREFERRED EMBODIMENT

With reference to FIGS. 1 and 2, the saw assembly 10 of the preferred embodiment of the invention comprises a support table 12 which has a table top 14 and support legs 18. Arranged behind the table 14 is a support frame 20 which has an upper platform 22 and support legs 24. A waste collector 30 is arranged between the table 14 and frame 20 and comprises a frame assembly 32 which supports a conveyor belt 33. The frame assembly 32 may be supported on legs 35.

Upper and lower guide rails 34 and 36 extend from one end of the frame 20 to the other end and are connected to the frame by suitable support posts 38 distributed evenly along platform 22. A carriage 40 is mounted on the rails 34 and 36 via roller wheels 42 and 43 which are coupled to the carriage 40 by brackets 44 and 46. As is clearly shown in FIG. 2, the rollers 42 and 43 are at different heights with respect to one another so that the front roller 42 (that is the roller to the left in FIG. 2) sits on top of the lower rail 36 and the other roller wheel 43 engages beneath the upper rail 34. The roller wheel 43 sits in a U-shaped section 47 of the bracket 46 for maintaining the roller wheel 43 in engagement with the rail 34. The roller wheels 42 and 43 both have concave roller surfaces for engaging the rails 34 and 36.

A first elongate tower assembly 50 is pivotally mounted relative to the frame 20 for rotation in a generally vertical plane as shown by arrow A in FIG. 1. A second elongate tower assembly 60 is also mounted for rotation in a generally vertical plane in the direction of arrow B in FIG. 1. As is clearly shown in FIG. 2, the second tower 60 includes a shaft 62 which is journalled in bearings 63 coupled to the carriage 40. The shaft 62 is connected to a cage 66 which is connected to tower frame 64. The cage 66 and tower frame 64 support a circular saw 68 which has a motor 69. The saw 68 projects through a slot 70 in the tower frame 64 for making a plumb cut on a workpiece W shown in FIG. 2.

A motor 71 is provided on the carriage 40 and has a motor shaft 72. The shaft 72 has a sprocket 74 and a sprocket 76 is arranged on the tower shaft 62. The sprockets 74 and 76 are joined by an endless chain 78 so that upon operation of the motor 71, the shaft 72 is driven to drive the chain 78 to in turn drive the sprocket 76 and therefore the shaft 62 to pivot the tower 60 about the axis of the shaft 62 to set the angle of the tower 60 relative to the vertical.

The tower 60 may also be moved towards and away from the tower 50 by pushing the tower 60 so that the roller wheels 42 and 43 roll on guide rails 34 and 36 to thereby adjust the position of the tower 60 relative to the tower 50 and set the length of a workpiece which is to be cut by the saw system. After the tower 60 has been positioned on rails 34 and 36 it is clamped in position by a clamp mechanism (not shown).

Rather than simply moving the tower 60 manually on the rails 34 and 36, a drive (not shown) can be used for automatically moving the tower assembly 60 on the rails 34 and 36 and locking the tower assembly 60 at a predetermined distance from the tower 50 to set the length of the workpiece w to be cut by the saw system.

The tower assembly 50 is generally the same as the tower assembly 60 except that it is not mounted on the rails 34 and 36 for movement but is rather fixed in the horizontal direction. The tower 50 is mounted for pivotal rotation by a shaft (not shown) identical to the shaft 62 which is journalled in bearings (not shown) fixed relative to the frame 20. The shaft associated with the tower 50 may also be driven by a motor and chain assembly identical to the motor and chain assembly 71, and 78 described with reference to FIG. 2, to set the angular position of the tower 50.

The tower 50 supports a pair of circular saws 90 and 92 which have motors 94 and 96. The saws 90 and 92 are supported in a cage generally identical to cage 66 described with reference to FIG. 2 and a tower frame 98. The tower frame 98 includes a pair of cutouts 100 and 102 to enable the circular saws 92 and 94 to project out of the cage and tower frame 98 for cutting the workpiece W. The saws 90 and 92 are set at an angle relative to one another such as an angle of 45° to form a double mitre cut on the workpiece W.

The tower 60 includes a rod 110 which is pivotally coupled to the tower frame 64 by links 112. A sleeve 114 is arranged on the rod 110 for sliding movement on the rod 110. The sleeve 110 supports a ram assembly 116 which includes a cylinder 118 and cylinder arm 120. An abutment pin 122 is also supported on the sleeve 114. A second ram assembly 130 is coupled at one end to the sleeve 114 and has a ram arm 132 coupled to the rod 110 by a link 134.

The first tower 50 also has a rod 140 which is provided with a sleeve 142. Once again, the sleeve 142 supports a ram assembly 144 which comprises a cylinder 146 and ram arm 148. The sleeve 142 also has an abutment pin 150.

The tower 50 is also provided with a second ram assembly 160 which comprises a cylinder 162 coupled to the tower frame 98 by a link 164. The cylinder 162 has a rod 165 which is connected to the sleeve 142.

In order to form jack rafters for a hip roof system, the length of the rafters is set by adjusting the position of the tower 60 relative to the tower 50 by sliding the tower 60 on the rails 34 and 36 and fixing the tower 60 in place at the desired distance.

The motors 71 associated with each of the towers 50 and 60 are operated to cause the tower 50 and tower 60 to pivot into the desired angular position to set the required angle of the double mitre cut to be made by the saws 90 and 92 and the plumb cut to be made by the saw 68.

The towers 50 and 60 are pivoted angularly in a vertical plane which is generally parallel to the workpiece W when the workpiece W is supported on the towers 50 and 60 so as to set a predetermined angle to the vertical and therefore a predetermined angle with respect to the workpiece W.

The order of positioning the tower 60 relative to the tower 50 and setting the angles of the towers 50 and 60 is arbitrary and either the angles can be first set and the tower 60 adjusted to the required distance or the tower 60 can be first adjusted to the desired distance and the angle then set. Alternatively, both the distance and angles could be set simultaneously under the control of a suitable controller.

The workpiece W can then be set on the abutment pins 150 and 122 associated with each of the towers 50 and 60 and the ram assemblies 144 and 116 can be actuated to cause the arms 148 and 120 to extend to clamp the workpiece W to the pins 150 and 122.

After the workpiece W has been clamped in place, the saws 68, 92 and 94 are switched on. The ram assemblies 130 and 160 are then operated to drive the sleeves 114 and 142 downward relative to the saws 68, 92 and 94 so that the workpiece W is driven past the saws so that the double mitre cut and plumb cut are made by the saws. Thus, the workpiece such as a jack rafter is simultaneously cut to form the double mitre cut and plumb cut to thereby produce a jack rafter of the desired length and with the mitre cut and plumb cut being at the required angle to suit the pitch of the hip roof system for which the jack rafter is to be used.

When the cylinder rods 165 and 132 come to the end of their stroke after the cuts have been made, the workpiece W is positioned on or just above table top 14. The towers 50 and 60 have ejector rams 200 which are in the form of cylinder and rod assemblies so that after release of the ram assemblies 144 and 116 to release clamping pressure on the workpiece W, the workpiece W can be pushed by the ejector rams 200 off the abutment pins 150 and 122 onto the table top 14 where it can then be removed by a workman. Waste material cut from the workpiece W falls onto conveyor belt 33 and may be conveyed by the belt 33 to one end of the saw assembly 10 for collection and disposal.

The cylinder rods 165 and 132 are then retracted to return the sleeves 142 and 114 to the starting position shown in FIG. 1 to receive the next workpiece which is to be cut.

Thus, the saw system according to the preferred embodiment of the invention simultaneously forms a plumb cut at one end of a timber rafter and a double mitre cut at the other end to thereby greatly improve productivity since it is not necessary to reset the angle of saw blades and reposition the workpiece in order to make the various cuts. In the preferred embodiment of this invention the cuts are made at the correct angle and the rafter is cut to the correct length with considerable accuracy and less manual effort than with conventional systems.

Since modifications within the spirit and scope of the invention may readily be effected by persons skilled within the art, it is to be understood that this invention is not limited to the particular embodiments described by way of example hereinabove.

I claim:

1. A saw system for cutting an elongate workpiece, including:

first support means for supporting a first saw assembly for cutting the workpiece;

second support means for supporting a second saw assembly for making a second cut in the workpiece;

first pivotal coupling means coupled to the first support means for rotating the first support means and first saw assembly in a substantially vertical plane for setting a cutting angle at which the first saw assembly cuts the workpiece;

second pivotal coupling means coupled to the second support means for rotating the second support means and second saw assembly in the substantially vertical plane for setting a cutting angle at which the second saw assembly cuts the workpiece; and workpiece moving means for moving the workpiece downwardly in a substantially vertical plane past the first saw assembly and the second saw assembly for cutting the workpiece;

wherein the first and second support means each comprise an elongate tower assembly, each tower assembly having a shaft coupled to a respective one of the pivotal coupling means for rotation of each tower assembly about a longitudinal axis of the respective shaft to thereby rotate the tower assemblies in the vertical plane, each tower assembly further having workpiece clamping means for clamping a workpiece to each tower assembly, wherein a respective one of the workpiece moving means is coupled to a respective one of the clamping means for driving the clamping means and therefore the workpiece downwardly past the saw assemblies for cutting the workpiece.

2. The saw system of claim 1 including guide means for guiding movement of the second support means and second saw assembly in a substantially horizontal plane relative to the first support means and first saw assembly to set the length of the workpiece cut by the saw system.

3. The saw system of claim 1 wherein the first saw assembly comprises two circular saws which are arranged at a predetermined angle with respect to one another to cut a double compound mitre cut on the workpiece.

4. The saw system of claim 1 wherein the second saw assembly comprises a single circular saw for cutting a plumb cut on the workpiece.

5. A saw system for cutting a workpiece, including:

a first pivotally mounted tower, a pair of first circular saws supported by the first tower and arranged at a predetermined angle with respect to one another for making a double mitre cut in the workpiece;

a second pivotally mounted tower spaced horizontally from the first tower, a second circular saw supported by the second tower for making a plumb cut in the workpiece;

angle setting means for pivoting and setting the towers at predetermined angles with respect to the vertical for setting predetermined angles of the double mitre cut and the plumb cut;

the first tower including a first workpiece clamping means mounted for movement relative to the pair of circular saws;

the second tower including a second workpiece clamping means mounted for movement relative to the second circular saw; and each tower further including workpiece driving means for moving the first and second clamping means, and therefore a workpiece when clamped by the first and second clamping means, downwardly relative to the and second towers past the first pair of first saws and the second saw for making the double mitre cut and plumb cut in the workpiece.

6. The saw system of claim 5 further including guide means for guiding movement of the second tower toward and away from the first tower to set the length of the workpiece cut by the saw system.

7. The saw system of claim 6 wherein the guide means comprises a pair of rails upon which the second tower is mounted, the second tower having rollers engaging the rails and enabling movement of the second tower toward and away from the first tower on the rails to thereby set the distance between the first and second towers and thereby the length of the workpiece cut by the saw system.

8. The saw system of claim 5 wherein each workpiece driving means comprises a rod arranged generally parallel to the longitudinal axis of the respective tower, a sleeve mounted for sliding movement on the rod, and a ram assembly connected to the sleeve for moving the sleeve on the rod.

9. The saw system of claim 8 wherein said first and second clamping means each comprise an abutment member on each sleeve and a clamping ram assembly on each sleeve for clamping the workpiece between each abutment member and the respective clamping ram assembly.

10. The saw system of claim 5 wherein each tower further includes a shaft pivotally mounting each tower to a base of the saw system, and wherein the angle setting means for each tower comprises a sprocket mounted on the shaft, a motor having an output shaft carrying a second sprocket, and a chain engaged with the first and second sprockets so that when the motor is operated, drive is transmitted from the second sprocket to the chain to the first sprocket and therefore to the shaft for rotating the shaft to pivotally move or rotate the towers about the axis of their respective shafts.

* * * * *